United States Patent Office 3,567,800
Patented Mar. 2, 1971

3,567,800
DIALKYL-2-(PHENALKOXYCARBONYL)-1-METHYLVINYL PHOSPHATE
Donald W. Stoutamire, Modesto, and Milton Silverman, La Habra, Calif., assignors to Shell Oil Company, New York, N.Y.
No Drawing. Filed Apr. 25, 1968, Ser. No. 724,240
Int. Cl. C07f 9/08; A01n 9/36
U.S. Cl. 260—941                       8 Claims

ABSTRACT OF THE DISCLOSURE

Novel dialkyl 2-(phenalkoxycarbonyl) - 1 - methylvinyl phosphates substituted on the phenyl moiety by a sulfur-containing functional group, primarily useful as miticides.

BACKGROUND OF THE INVENTION

Field of the invention

This invention relates to novel organophosphates which are primarily useful as miticides.

Description of the prior art

U.S. Pat. 2,982,686 discloses insecticidal, including miticidal, dialkyl 2-(phenalkoxycarbonyl) - 1 - methylvinyl phosphates substituted on the phenyl moiety by alkoxy.

SUMMARY OF THE INVENTION

It now has been found that when the alkoxy substituent of the phosphates of U.S. Pat. 2,982,686 is replaced by alkylthio, or other sulfur-containing functional group, the miticidal activity is enhanced greatly.

This invention accordingly is a novel class of dialkyl-2-(phenalkoxycarbonyl) - 1 - methylvinyl phosphates substituted on the phenyl moiety by a sulfur-containing functional group.

DESCRIPTION OF THE PREFERRED EMBODIMENTS

The novel compounds of this invention can be described by the general formula:

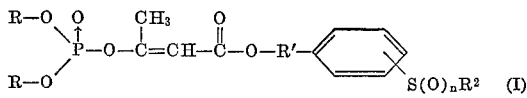

(I)

wherein each R is the same, or is different, and is alkyl of one to four carbon atoms or is alkyl of from two to eight carbon atoms containing one or two oxy (—O—) oxygen atoms linking carbon atoms, R' is alkylene of from one to four carbon atoms, $n$ is 0, 1 or 2, and $R^2$ is alkyl of from one to three carbon atoms, or when $n=2$, $R^2$ can be amino, —$NR^3R^4$, wherein $R^3$ and $R^4$ can be hydrogen or the same or different alkyl of from one to four carbon atoms.

It is generally to be preferred that the moiety, R', contain only one carbon atom linking the phenyl moiety to the carbonyl moiety, any other carbon atom(s) forming a side chain.

Having most miticidal activity, and therefore especially to be preferred, are the subclasses wherein R' is

—CH(CH₃)—

$R^2$ is methyl or ethyl, the sulfur atom is bonded to the carbon atom in the para position on the phenyl ring relative to the carbon atom bonded to R', and $n$ is zero, in the one case and is two in the other.

Typical, illustrative examples of the class of novel compounds are described in the working examples set out hereinafter Others are:

Methoxyethoxyethyl methyl 2-(α-methyl-4-(methylthio)-benzyloxycarbonyl)-1-methylvinyl phosphate;
Ethyl methyl 2-(α-methyl-4-(methylthio)benzyloxycarbonyl)-1-methylvinyl phosphate;
Methoxyethoxyethyl methyl 2-(α-methyl-4-(methylsulfonyl)benzyloxycarbonyl)-1-methylvinyl phosphate;
Ethyl methoxyethoxyethyl 2-(α-methyl-4-(methylsulfonyl)benzyloxycarbonyl)-1-methylvinyl phosphate;
Ethyl ethoxyethyl 2-(α-methyl-4-(methylthio)benzyloxycarbonyl)-1-methylvinyl phosphate;
Methyl propyl 2-(α-methyl-4-(methylthio)benzyloxycarbonyl)-1-methylvinyl phosphate;
Methyl isopropyl 2-(α-methyl-4-(methylthio)benzyloxycarbonyl)-1-methylvinyl phosphate;
Methyl isopropoxyethoxyethyl 2-(α-methyl-4-(methylthio)benzyloxycarbonyl)-1-methylvinyl phosphate.

Compounds of this class can be prepared by isomerization of the corresponding iso-enol phosphates having the formula:

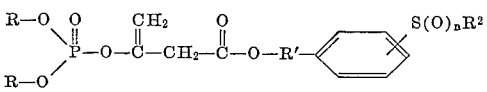

These iso-enols are the subject of copending application Ser. No. 724,241, filed Apr. 25, 1968. Briefly described, the iso-enols can be prepared by the following synthesis:

(a) Diketene is chlorinated to form 4 - chloroacetoacetyl chloride $$ClCH_2—C(O)—CH_2—C(O)Cl$$

This reaction is described by Hurd and Abernathy, J. Am. Chem. Soc., 62, 1147 (1940). Briefly, the chlorination is readily effected by introducing chlorine into a solution of diketene in carbon tetrachloride or methylene chloride at about 0° C. The chloride is recovered by removal of the solvent at reduced pressure or is used as is in solution.

(b) The acid chloride is reacted with the appropriate phenalkyl alcohol,

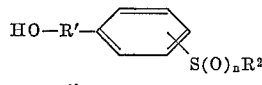

to give the corresponding ester,

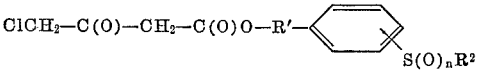

The reaction of an alcohol with the 4 - chloroacetoacetyl chloride, too, is described by Hurd and Abernathy. Briefly, the reaction can be effected by adding the chloride to a solution of the alcohol in a suitable inert solvent, such as methylene chloride, at the reflux temperature to remove HCl as formed. Alternatively, sodium carbonate or bicarbonate can be added to remove the HCl.

The alcohols can be prepared by reduction of the corresponding acetophenones, 4-methylthioacetophenone is a known compound (Cutter et al., J. Am. Chem. Soc., 74, 5475 (1952) and references cited therein). Isomers can be prepared in the same manner as it was prepared. The corresponding sulfinyl and sulfonyl compounds can be prepared by controlled peracid oxidation of the corresponding alkylthio compounds. The oxidation is carried out according to conventional techniques for the oxidation of thio compounds to the corresponding sulfoxides and sulfones, these techniques being described in the article by Swern, Chemical Reviews 45, pp. 33–34 (1949). Thus, the alkylsulfinyl compounds are conveniently and readily prepared by oxidizing the corresponding alkylthio compounds with a peracid, such as peracetic acid, m-chloroperbenzoic acid, or monoperphthalic acid, one mole of the peracid being employed per mole of the alkylthio compound. The reaction ordinarily is best conducted in a suitable solvent at about ordinary room temperature. Where aliphatic peracids such as peracetic acid are used, lower polyhaloalkanes such as chloroform, are suitable solvents. Suitable temperatures range from about −10° C. to about 40° C., with temperatures of from about −5° C. to about 15° C. generally being preferred. The alkylsulfinyl product is recovered by conventional techniques—the final reaction mixture generally is washed with aqueous base, such as an aqueous solution of sodium bicarbonate or a dilute aqueous solution of sodium hydroxide to neutralize acid present, the organic phase is separated, dried, stripped of solvent, and the alkyl sulfinyl product is recovered by distillation, ordinarily under reduced pressure to reduce the boiling temperature and thus avoid possible decomposition of the product.

The alkylsulfonyl compounds are conveniently and readily produced by oxidizing the corresponding alkylthio compounds in the manner described for producing the alkyl sulfinyl compounds, above, except that at least two moles of peracid are employed per mole of the alkylthio compound. Generally, a small excess—say, 5–10% excess—of peracid is desirable to speed up and insure complete reaction within a reasonable reaction time.

Reduction of the acetophenone to the alcohol can be readily effected by reduction with a hydride reducing agent, such as sodium borohydride or lithium aluminum hydride; the former is preferred and the technique for its use is shown in Chaiken et al., J. Am. Chem. Soc., 71, 122 et seq. (1949) and references cited therein. Briefly, essentially stoichiometric quantities of the reactants are mixed in a suitable solvent and allowed to react at room temperature or slightly above (25–50° C.). In many cases, cooling will be necessary. With sodium borohydride, water or a lower alkanol is a suitable solvent; with lithium aluminum hydride, a non-hydroxylic solvent, such as ether, is suitable. In some cases, where sodium borohydride is used, it may be necessary to include in the reaction mixture, or to treat the final reaction mixture with, an alkali to free the product alcohol from the intermediate borate complex.

(c) Reaction of the ester with a trialkyl phosphite to form the corresponding enol phosphate

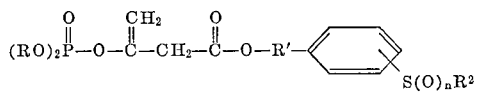

This reaction is the so-called Perkow Reaction, described in Gefter, "Organophosphorus Monomers and Polymers" (Associated Technical Services, Inc. 1962), at pages 31–36.

(d) Isomerization of the iso-enol phosphate to the corresponding enol structure—that is, to the compounds of this invention, having the general structural Formula I.

This isomerization is conducted by treating the iso-enol phosphate with a strong base, with or without use of a suitable inert solvent. Ordinarily, the isomerization can be effected most conveniently by mixing the reactants and holding the mixture at room temperature for a time sufficient to effect the desired reaction. In some cases, the mixture may be heated slightly—say, from 35–50° C.—to speed up and/or insure completion of the reaction. Suitable bases are alkali metal alkoxides, trialkyl amines, and cyclic nitrogen bases, such as pyridine. Where an alkoxide is used as the base, the solvent may be the alkanol corresponding to the alkoxides. Methylene chloride is a suitable solvent where an amine or nitrogen base is used. The amount of base ordinarily required, based on one mole of alcohol reactant: about 0.1 to 0.4 mole.

The iso-enol phosphates and their isomerization to enol phosphates of this invention are the subject of co-pending application S.N. 724,241, filed Apr. 25, 1968.

Alternatively, those members of the novel compounds of this invention containing an alkylsulfinyl- or alkylsulfonyl-moiety can be prepared by first preparing the corresponding alkylthio-substituted compound and oxidizing it.

The oxidation is effected in the manner described already for oxidation of alkylthioacetophenones.

Preparation of typical species of compounds of this invention is described in the following examples. In these examples, "parts" means parts by weight unless otherwise indicated, and parts by weight bear the same relationship to parts by volume as does the kilogram to the liter.

EXAMPLE I

Preparation of dimethyl 2-(alpha-methyl-4-(methylthio) benzyloxycarbonyl)-1-methylvinyl phosphate (A)

(a) Preparation of 4-chloroacetoacetyl chloride: 55 parts of diketene in 400 parts by volume of methylene chloride was cooled to −40° C. and treated with 46.5 parts of chlorine over a 30 minute period maintaining the temperature of the exothermic reaction at −40° C. The mixture was stirred at room temperature for an additional one and one-half hours to give the crude 4-chloroacetoacetyl chloride in solution.

(b) Preparation of alpha-methyl-4-(methylthio)benzyl 4-chloroacetoacetate: The solution obtained in (a) above was added to 100 parts of alpha-methyl-4-(methylthio) benzyl alcohol in mixture with 200 parts by volume of methylene chloride and 87 parts of sodium carbonate over a period of one hour at reflux. The mixture was refluxed for an additional one hour, cooled, filtered and washed with 3 N HCl, water, 5% NaHCO$_3$ and then water. After drying with anhydrous magnesium sulfate, the solution was stripped on a rotary evaporator at water aspirator vacuum to give 151 parts of crude product as a brown oil. Crystallization from ether at low temperature (product liquid at room temperature) gave 107 parts of alpha-methyl-4-(methylthio)benzyl 4-chloroacetoacetate as a light brown oil which was identified by elemental and infrared spectrum analyses.

Elemental anlysis (percent by weight).—Calculated for SO$_3$ClC$_{13}$H$_{15}$: Cl, 12.4; Acid elements 95.5. Found: Cl. 13.8; Acid elements 88.6.

A typical preparation of alpha-methyl-4-(methylthio) benzyl alcohol is performed as follows:

25.6 parts of sodium borohydride, 400 parts by volume of ethanol and 5 drops of 5% aqueous sodium hydroxide were placed in a reactor. To the constantly stirred mixture, 112 parts of 4'-(methylthio)acetophenone in 200 parts by volume of ethanol was slowly added over a period of about one hour. The mixture was cooled to hold its temperature at about 30° C. After addition of the acetophenone was complete, an additional 10 parts of sodium borohydride was added and the mixture stirred for 3 hours. The mixture was then diluted with water and methylene chloride, the two phases were separated and the aqueous phase extracted with methylene chloride. The methylene chloride phases were combined, washed with water, dried, and stripped under house vacuum to give 92.6 parts of yellow oil. The oil was extracted with 250 parts by volume of ether, the extract was cooled with Dry Ice. A yellow solid precipitated, was collected by filtration and washed with cold hexane/ether. A second crop (identical to the first by infra-red spectrum analysis) was obtained, to yield 69.0 parts of alpha-methyl-4-(methylthio)benzyl alcohol.

(c) Preparation of dimethyl 1-(alpha - methyl-4-(methylthio)benzyloxycarbonylmethyl)vinyl phosphate: 303 parts of trimethyl phosphite was added to 637 parts of ester from (b) above at 70° C. The reaction was exothermic and the temperature was maintained at 75–85° by cooling during the addition period of 15 minutes and for 15 minutes thereafter. The mixture was then heated to 90° C. for one hour and then stripped in a rotary evaporator at 75° C. and 0.5 torr pressure to give 785 parts of crude dimethyl 1-(alpha-methyl-4-(methylthio)benzyloxycarbonylmethyl)vinyl phosphate which was identified by infrared spectrum analysis.

(d) Preparation of dimethyl 2-(alpha - methyl-4-(methylthio)benzyloxycarbonyl) - 1 - methylvinyl phosphate (A): Triethylamine, 2.38 parts, and 84.7 parts of the crude phosphate from (c) above were mixed and heated at 45° C. for 2¾ hours. The mixture then was cooled, dissolved in methylene chloride and washed with water, 5% sodium bicarbonate and then water. The mixture was dried with anhydrous magnesium sulfate and then stripped using a rotary evaporator to 55° C. and 0.4 torr pressure to give 73 parts of crude dimethyl 2-(alpha-methyl - 4 - (methylthio)benzyloxycarbonyl)-1-methylvinyl phosphate which was identified by elemental, infrared and Nuclear Magnetic Resonance spectrum analyses.

Elemental analysis (percent by weight).—Calculated for $PSO_6C_{15}H_{21}$: P, 8.6; Cl, 0.0. Found: P, 7.8; Cl, 1.4.

Chromatography of a similarly prepared sample using silica gel, ether: $CCl_4$ (1:19) and ether:hexane (4:1) gave essentially pure (A) as shown by infrared, NMR spectral analyses and elemental analysis (percent by weight):

Calculated for $PSO_6C_{15}H_{21}$: P, 8.6; S, 8.9. Found: P, 8.6; S, 8.8.

EXAMPLE II

Preparation of dimethyl 2-(alpha-methyl-4-(methylsulfinyl)benzyloxycarbonyl)-1-methylvinyl phosphate (B)

A solution of 14.2 parts of 85% m-chloroperbenzoic acid in 150 parts of chloroform was added over a period of 20 minutes to a cooled solution of 25.2 parts of (A) in 50 parts of chloroform at −5 to 0° C.

After stirring an additional five minutes, and warming to room temperature, the mixture was washed with 5% sodium bicarbonate, was dried with anhydrous magnesium sulfate and stripped on a rotary evaporator at 35° C. at 0.5 torr pressure to leave 26.2 parts of light orange liquid. Chromatography using silica gel and methanol gave 17.3 parts of (B) identified by infrared and NMR spectral analyses and by elemental analysis (percent by weight):

*Analysis.*—Calculated for $PSO_7C_{15}H_{21}$: P, 8.2; S, 8.5. Found: P, 7.8; S, 8.8.

EXAMPLE III

Preparation of dimethyl 2-(alpha-methyl-4-(methylsulfonyl)benzyloxycarbonyl)-1-methylvinyl phosphate (C)

(a) Following the oxidation procedure of Example II above, 25.2 parts of (A) and 30.2 parts of m-chloroperbenzoic acid gave 29.9 parts of crude (C) as a pale yellow oil. Crystallization gave 19.5 parts of (C) as a white solid melting at 54–62° C. identified by infrared and NMR spectrum analyses and elemental analysis (percent by weight):

Calculated for $PSO_8C_{15}H_{21}$: P, 7.9; S, 8.2. Found: P, 7.5; S, 9.0.

(b) Following the procedure set out in Example I(a) through (d), alpha-methyl-4-(methylsulfonyl)benzyl alcohol, 200 parts, yielded 293 parts of crude (C) when stripped in a wiped-film molecular still at 170° C. (0.005 torr) solidified to a tan solid shown by infrared spectrum analysis to contain 90% (C).

Elemental analysis (percent by weight).—Calculated: Cl, 0.0. Found: Cl, 0.3.

Typical preparation of alpha-methyl-4-(methylsulfonyl)benzyl alcohol is accomplished as follows:

139 parts of 4′-(methylthio)acetophenone and 200 parts by volume of acetic acid were placed in a reactor. The mixture was heated to 50° C., then 175 parts by volume of 10.5 molar hydrogen peroxide was added slowly until the temperature of the mixture rose to about 107° C., and the mixture maintained at this temperature until all the hydrogen peroxide had been added. Then the mixture was refluxed for one hour, cooled and poured onto about 500 parts of ice. The solid was filtered out, washed with water and dried to yield 135 parts of 4′-(methylsulfonyl)acetophenone, as off-white crystals melting at 121–124° C.

9.5 parts of sodium borohydride dissolved in about 250 parts by volume of ethanol was placed in a reactor. 99 parts of the 4′-(methylsulfonyl)acetophenone was partially dissolved in about 200 parts by volume of ethanol, the mixture made basic with 5% aqueous sodium hydroxide, and the mixture was added slowly over one hour to the reactor, with thorough stirring of the reaction mixture. The temperature of the reaction mixture was maintained at about 30° C. At the end of reaction, excess sodium borohydride was decomposed with acetone, the mixture was diluted with water, extracted with methylene chloride, organic phase dried, and stripped of solvent of a rotary evaporator, to leave an off-white solid. This solid was treated with hot cyclohexane and the solution allowed to cool. 78.9 parts of alpha-methyl-4-(methylsulfonyl)benzyl alcohol, melting at 98–99° C., was obtained. A second crop of 8.2 parts, melting at 97–98° C., also was obtained.

EXAMPLE IV

Following these procedures, the compounds of this invention shown in the following table were prepared.

$$R^1-O\underset{R^2-O}{\overset{\uparrow}{>}}P-O-\underset{}{C}=\underset{H}{\overset{CH_3}{C}}-\overset{O}{\overset{\|}{C}}-O-R'-\underset{}{\bigcirc}-X$$

| | $R^1$ | $R^2$ | $R'$ | X | Method | Elemental analyses, weight percent | | | |
|---|---|---|---|---|---|---|---|---|---|
| | | | | | | Found | | Calculated | |
| | | | | | | P | S | P | S |
| Compound: | | | | | | | | | |
| D | $-CH_3$ | $-CH_3$ | $-CH(CH_3)-$ | $m-SO_2CH_3-$ | III | 6.5 | 6.1 | 7.9 | 8.2 |
| E | $-CH_3$ | $-CH_3$ | $-CH(CH_3)-$ | $p-SC_2H_5-$ | Ia-d | 8.0 | 8.1 | 8.1 | 8.4 |
| F | $-CH_3$ | $-CH_3$ | $-CH(CH_3)-$ | $p-SOC_2H_5-$ | II | 6.4 | 7.2 | 7.9 | 8.2 |
| G | $-CH_3$ | $-CH_3$ | $-CH(CH_3)-$ | $p-SO_2C_2H_5-$ | III | 5.6 | 6.3 | 7.8 | 7.9 |
| H | $-CH_3$ | $-CH_3$ | $-CH(CH_3)-$ | $p-S-iC_3H_7-$ | Ia-d | 8.0 | 8.0 | 8.15 | 8.25 |
| I | $-CH_3$ | $-CH_3$ | $-CH(CH_3)-$ | $p-SO-iC_3H_7-$ | II | 5.9 | 8.3 | 7.7 | 7.9 |
| J | $-CH_3$ | $-CH_3$ | $-CH(CH_3)-$ | $p-SO_2-iC_3H_7-$ | III | 6.1 | 6.6 | 7.4 | 7.6 |
| K | $-C_2H_4$ | $-C_2H_4$ | $-CH(CH_3)-$ | $p-SCH_3-$ | Ia-d | 7.7 | 8.4 | 8.0 | 8.3 |
| L | $-CH_3$ | $CH_3OC_2H_4-$ | $-CH(CH_3)-$ | $p-SCH_3-$ | Ia-d | 7.5 | 8.3 | 7.7 | 7.9 |
| M | $-CH_3$ | $-CH_3$ | $-CH(CH_3)-$ | $p-SO_2-N(CH_3)_2$ | Ia-d | 6.1 | 8.0 | 7.4 | 7.6 |
| N | $-CH_3$ | $-CH_3$ | $-C(CH_3)_2-$ | $p-SO_2CH_3-$ | Ia-d | 5.3 | 7.3 | 7.7 | 7.2 |
| O | $-CH_3$ | $-CH_3$ | $-CH_2-$ | $p-SCH_3-$ | Ia-d | 7.9 | 8.6 | 8.9 | 9.9 |
| P | $-CH_3$ | $-CH_3$ | $-CH_2-$ | $p-SOCH_3-$ | II | 6.3 | 7.3 | 8.2 | 8.5 |
| Q | $-CH_3$ | $-CH_3$ | $-CH_2-$ | $p-SO_2CH_3-$ | III | 7.9 | 8.5 | 8.2 | 8.5 |
| R | $-CH_3$ | $-CH_3$ | $-CH_2-$ | $o-SCH_3-$ | Ia-d | 8.4 | 9.5 | 8.9 | 9.2 |
| S | $-CH_3$ | $-CH_3$ | $-CH_2-$ | $m-SCH_3-$ | Ia-d | 7.7 | 9.3 | 8.9 | 9.2 |
| T | $-CH_3$ | $-CH_3$ | $-CH_2-$ | $m-SO_2CH_3-$ | III | 7.6 | 8.3 | 8.2 | 8.5 |

Compounds of this invention have been found to exhibit a high level of insecticidal activity with respect to a variety of insects and mites. In particular, they have been found to be outstanding miticides.

By the term "insects" is meant not only the members of the class Insecta, but also related to similar organisms belonging to allied classes of arthropods, and including mites, ticks, spiders, wood lice, and the like.

The compounds of this invention can be employed for insecticidal purposes by the use of any of the methods which are conventionally employed in that art. For example, the compounds can either be sprayed or otherwise applied in the form of solutions of dispersions, or they can be sorbed on inert, finely divided solids and applied as dusts. Useful solutions for application by spraying, brushing, dipping, and the like, can be prepared by using as the solvent any of the well known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long-chain fatty alcohols, alkyl aryl sulfonates, long-chain alkyl sulfonates, phenol-ethylene oxide condensates, ammonium salts, and the like. These solutions can be employed as such, or, more preferably, they can be dispersed or emulsified in water and the resulting aqueous dispersion or emulsion applied as a spray. Solid carrier materials which can be employed include talc, bentonite, lime, gypsum, pyrophyllite, and similar inert solid diluents. If desired, the compounds of the present invention can be employed as aerosols, as by dispersing the same into the atmosphere by means of a compressed gas.

The concentration of the compounds to be used with the above carriers is dependent upon many factors, including the particular compound utilized, the carrier employed, the method and conditions of application, and the insect species to be controlled, a proper consideration and resolution of these factors being within the skill of those versed in the insecticide art. In general, however, the compounds of this invention are effective in concentrations of from about 0.01% to 0.5% based upon the total weight of the composition, though under some circumstances as little as about 0.00001% or as much as 2% or even more of the compound can be employed with good results from an insecticidal standpoint. Concentrates suitable for sale for dilution in the field may contain as much as 25–50% by weight, or even more, of the insecticide.

When employed as an insecticide, a compound of this invention can be employed either as the sole toxic ingredient of the insecticidal composition or can be employed in conjunction with other insecticidally active materials. Representative insecticides of this latter class include the naturally occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl p-nitrophenyl thiophosphate, dimethyl 2,2-dichlorovinyl phosphate, 1,2-dibromo-2,2-dichloroethyl dimethyl phosphate, azobenzene, and the various compounds of arsenic, lead, and/or fluorine.

The following examples demonstrate the insecticidal properties of typical compounds of this invention.

EXAMPLE V

Solutions of typical compounds of the invention were made up employing either a neutral petroleum distillate boiling within the kerosene range or acetone as solvent. The solutions were tested for toxicity against the two-spotted spider mite, Tetranychus, telarius, and the pea aphid, Macrosiphum pisi, by spraying groups of plants infested with these insects under controlled conditions which varies from one test to the other only with respect to the test material and its concentration. These toxicities were compared to the toxicities of parathion, an insecticide widely used for control of these insects. In each set of tests the conditions were directly comparable, i.e., the same test insect, same species of plant, environment, etc., were used and the concentration of active material in each case was the same. The toxicities are expressed in terms of the relationship between the amount of parathion required to produce 50% mortality of the test insects and the amount of the test material required to produce the same mortality. Assigning parathion an arbitrary rating of 100, the toxicity of the test materials is expressed in terms of the toxicity index which compares the activity on a percentage basis with that of the parathion. That is to say, a test compound having a toxicity index of 50 would be half as active as parathion, while one having a toxicity index of 200 would be twice as active as parathion.

The results obtained in these tests are set out in Table I.

TABLE I

| Compound: | Test insect | |
|---|---|---|
| | Pea aphid | 2-spotted spider mite |
| A | >250(426) | >400 |
| B | 69 | >400 |
| C | 43 | >400 |
| D | >100 | >400 |
| E | >100 | >400 |
| F | 82 | >400 |
| G | 58 | >400 |
| H | 56 | >400 |
| I | 28 | 284 |
| J | 18 | >400 |
| K | 97 | >400 |
| L | >100 | >400 |
| M | 30 | >400 |
| N | 40 | >400 |
| O | 78 | >400 |
| P | 25 | >400 |
| Q | 28 | >400 |
| R | 60 | 233 |
| S | 27 | >400 |
| T | 12 | >400 |

We claim as our invention:
1. Compounds of the formula

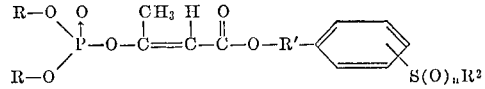

wherein each R is the same or different alkyl of one to four carbon atoms, or is alkyl of from two to eight carbon atoms containing one or two oxy oxygen atoms linking carbon atoms, R' is alkylene of from one to four carbon atoms, $n$ is 0, 1 or 2, and $R^2$ is alkyl of one to three carbon atoms, or when $n=2$, $R^2$ can be dialkylamino in which each alkyl moiety contains from one to four carbon atoms.

2. Compounds according to claim 1 wherein R' contains only one carbon atom linking the phenyl moiety to the carbonyl moiety.

3. Compounds according to claim 2 wherein R' is —CH(CH$_3$)—, $R^2$ is methyl or ethyl, the sulfur atom is bonded to the carbon atom in the para-position of the phenyl ring, and $n$ is zero or two.

4. The compound according to claim 3 wherein both of R are methyl, $n$ is zero and $R^2$ is methyl.

5. The compound according to claim 3 wherein both of R are methyl, $n$ is one and $R^2$ is methyl.

6. The compound according to claim 3 wherein both of R are methyl, $n$ is two and $R^2$ is methyl.

7. The compound according to claim 2 wherein one of R is methyl, the other is 2-(methoxy)ethyl, $n$ is zero and $R^2$ is methyl.

8. The compound according to claim 2 wherein both of R are methyl, R' is —CH$_2$—, $R^2$ is methyl, $n$ is zero and the sulfur atom is bonded to the carbon atom in the para-position of the phenyl ring.

References Cited
UNITED STATES PATENTS 2,982,686    5/1961    Whetstone et al. ____ 260—941X CHARLES B. PARKER, Primary Examiner A. H. SUTTO, Assistant Examiner U.S. Cl. X.R.

260—481, 544, 969, 98.9; 424—212